United States Patent
Lee et al.

(10) Patent No.: US 12,374,724 B2
(45) Date of Patent: Jul. 29, 2025

(54) METHOD OF PREPARING SECONDARY BATTERY

(71) Applicant: LG ENERGY SOLUTION, LTD., Seoul (KR)

(72) Inventors: Dong Jun Lee, Daejeon (KR); Hyun Woo Park, Daejeon (KR); Sa Rah Kim, Daejeon (KR); Dong Hui Kim, Daejeon (KR); Kwang Ho Yoo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 503 days.

(21) Appl. No.: 17/773,790

(22) PCT Filed: Mar. 5, 2021

(86) PCT No.: PCT/KR2021/002741
§ 371 (c)(1),
(2) Date: May 2, 2022

(87) PCT Pub. No.: WO2021/177776
PCT Pub. Date: Sep. 10, 2021

(65) Prior Publication Data
US 2022/0393245 A1 Dec. 8, 2022

(30) Foreign Application Priority Data
Mar. 6, 2020 (KR) .................. 10-2020-0028545

(51) Int. Cl.
*H01M 10/0585* (2010.01)
*H01M 4/04* (2006.01)
(Continued)

(52) U.S. Cl.
CPC ..... *H01M 10/0585* (2013.01); *H01M 4/0459* (2013.01); *H01M 4/1395* (2013.01); *H01M 4/386* (2013.01); *H01M 10/0525* (2013.01)

(58) Field of Classification Search
CPC .......... H01M 10/0585; H01M 4/0459; H01M 4/1395; H01M 4/386; H01M 10/0525
See application file for complete search history.

(56) References Cited

U.S. PATENT DOCUMENTS

| | | |
|---|---|---|
| 2002/0018935 A1 | 2/2002 | Okada |
| 2012/0075771 A1 | 3/2012 | Jin et al. |

(Continued)

FOREIGN PATENT DOCUMENTS

| | | |
|---|---|---|
| CN | 101364644 A | 2/2009 |
| CN | 105489395 A | 4/2016 |

(Continued)

OTHER PUBLICATIONS

Machine translation of CN-110600285-A (Year: 2024).*

(Continued)

*Primary Examiner* — Milton I Cano
*Assistant Examiner* — Albert Michael Hilton
(74) *Attorney, Agent, or Firm* — Birch, Stewart, Kolasch & Birch, LLP

(57) ABSTRACT

A method of preparing a secondary battery including pre-lithiating an electrode assembly including an electrode structure including a plurality of electrodes and a plurality of separators, and a metal substrate. The plurality of electrodes and the plurality of separators are alternatingly stacked. The pre-lithiating includes supplying lithium ions from one of the plurality of positive electrodes to one of the plurality of negative electrodes up to a state of charge (SOC) of A % by electrically connecting one of the plurality of positive electrodes and one of the plurality of negative electrodes and (Continued)

applying a first current, supplying lithium ions from the metal substrate to the positive electrodes up to B % of capacity of the positive electrodes by electrically connecting the metal substrate and the positive electrodes and applying a second current, after applying the first current, and resting the electrode assembly, after applying the second current.

12 Claims, 2 Drawing Sheets

(51) Int. Cl.
*H01M 4/1395* (2010.01)
*H01M 4/38* (2006.01)
*H01M 10/0525* (2010.01)

(56) References Cited

U.S. PATENT DOCUMENTS

| | | | |
|---|---|---|---|
| 2012/0107680 A1* | 5/2012 | Amiruddin | H01M 4/0447 29/623.1 |
| 2012/0251880 A1 | 10/2012 | Utsunomiya | |
| 2014/0002960 A1* | 1/2014 | Tezuka | H01G 11/70 361/508 |
| 2015/0017543 A1 | 1/2015 | Lee et al. | |
| 2015/0364795 A1 | 12/2015 | Stefan et al. | |
| 2017/0081199 A1 | 3/2017 | Haag | |
| 2017/0084914 A1 | 3/2017 | Haag | |
| 2017/0084960 A1 | 3/2017 | Haag | |
| 2018/0248168 A1 | 8/2018 | Yokoshima et al. | |
| 2020/0036003 A1 | 1/2020 | Haag | |
| 2020/0235419 A1 | 7/2020 | Chae et al. | |

FOREIGN PATENT DOCUMENTS

| | | | |
|---|---|---|---|
| CN | 110214387 A | 9/2019 | |
| CN | 110224182 A | 9/2019 | |
| CN | 110600285 A | * 12/2019 | ............ H01G 11/50 |
| JP | 2008-124227 A | 5/2008 | |
| JP | 2008-305928 A | 12/2008 | |
| JP | 2011-216576 A | 10/2011 | |
| JP | 2012-99346 A | 5/2012 | |
| JP | 2012-151395 A | 8/2012 | |
| JP | 2012-216401 A | 11/2012 | |
| JP | 2014-120701 A | 6/2014 | |
| JP | 2018-142604 A | 9/2018 | |
| KR | 10-2014-0016899 A | 2/2014 | |
| KR | 10-2015-0014877 A | 2/2015 | |
| KR | 10-2019-0007296 A | 1/2019 | |
| KR | 10-1964508 B1 | 4/2019 | |
| KR | 10-2019-0103232 A | 9/2019 | |

OTHER PUBLICATIONS

An, Seong Jin, et al. "The state of understanding of the lithium-ion-battery graphite solid electrolyte interphase (SEI) and its relationship to formation cycling." Carbon 105 (2016): 52-76. (Year: 2016).*
Extended European Search Report for European Application No. 21763559.8, dated May 9, 2023.
International Search Report for PCT/KR2021/002741 mailed on Jun. 17, 2021.
Tsuda et al., "An Improved High-rate Discharging Performance of "Unbalanced" LiFePO4 Cathodes with Different LiFePO4 Loadings by a Grid-patterned Micrometer Size-holed Electrode Structuring," Electrochemistry, vol. 87, No. 6, Oct. 11, 2019, pp. 370-378.

* cited by examiner

METHOD OF PREPARING SECONDARY BATTERY

TECHNICAL FIELD

Cross-Reference to Related Applications

This application claims priority from Korean Patent Application No. 10-2020-0028545, filed on Mar. 6, 2020, the disclosure of which is incorporated by reference herein.

Technical Field

The present invention relates to a novel method of preparing a secondary battery in which, during pre-lithiation of the secondary battery, after a positive electrode and a negative electrode are connected to transfer lithium to the negative electrode, the positive electrode and a lithium layer are connected to transfer lithium to the positive electrode.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In general, the lithium secondary battery includes a positive electrode, a negative electrode, a separator disposed between the positive electrode and the negative electrode, an electrolyte, and an organic solvent. Also, with respect to the positive electrode and the negative electrode, an active material layer including a positive electrode active material or a negative electrode active material may be formed on a current collector. A lithium-containing metal oxide, such as $LiCoO_2$ and $LiMn_2O_4$, is generally used as the positive electrode active material in the positive electrode, and, accordingly, a carbon-based active material or silicon-based active material containing no lithium is used as the negative electrode active material in the negative electrode.

Particularly, pure silicon among the negative electrode active materials is attracting attention in terms of having a capacity approximately 10 times higher than that of the carbon-based active material, and is advantageous in that high energy density may be achieved even with a thin electrode due to its high capacity. However, the silicon has a limitation in its use due to low initial efficiency and excessive volume expansion according to charge and discharge.

In order to address the low initial efficiency of the silicon, processes of intercalating lithium into the negative electrode in advance (pre-lithiation) have been used. Among these processes, after preparing an electrode assembly, a method of supplying lithium to the negative electrode by connecting the negative electrode and lithium metal is used. However, this method reduces processability because it takes a lot of time to reach a desired pre-lithiation level, and amounts of lithium ions intercalated into the negative electrodes in the electrode assembly are significantly different from each other. Accordingly, capacity and life characteristics of the battery may be degraded.

In the present invention, a new method of preparing a secondary battery, in which pre-lithiation may be performed at a faster rate and lithium ions may be uniformly intercalated into negative electrodes, is introduced.

DISCLOSURE OF THE INVENTION

Technical Problem

An aspect of the present invention provides an improvement in preparation processability of a battery by improving a pre-lithiation rate and an improvement in capacity and life (cycle) characteristics of the battery by uniformly intercalating lithium ions into negative electrodes and positive electrodes.

Technical Solution

According to an aspect of the present invention, there is provided a method of preparing a secondary battery which includes: pre-lithiating an electrode assembly which includes an electrode structure including a plurality of electrodes and a plurality of separators; and a metal substrate, wherein the electrode and the separator are alternatingly stacked, the metal substrate is disposed on an outermost surface of the electrode structure in a direction in which the electrode and the separator are stacked, the electrode includes a negative electrode including a negative electrode active material layer; and a positive electrode including a positive electrode active material layer, and the positive electrode and the negative electrode are spaced apart from each other with the separator disposed therebetween, wherein the pre-lithiating includes a first step of supplying lithium ions from the positive electrode to the negative electrode up to a state of charge (SOC) of A % by electrically connecting the positive electrode and the negative electrode and applying a first current; a second step of supplying lithium ions from the metal substrate to the positive electrode up to B % of capacity of the positive electrode by electrically connecting the metal substrate and the positive electrode and applying a second current, after the first step; and a third step of resting the electrode assembly, after the second step, and A and B satisfy A>B.

Advantageous Effects

According to the present invention, a positive electrode and a negative electrode are electrically connected in an electrode assembly to intercalate lithium ions from the positive electrode into the negative electrode (first step), and the positive electrode and a metal substrate including a lithium layer are then connected to transfer lithium ions to the positive electrode (second step). Also, a state of charge (SOC) % (expressed as an SOC of A % in the present specification) targeted in the first step is greater than a ratio (expressed as B % of positive electrode capacity in the present specification) of capacity of the lithium ions intercalated into the positive electrode to capacity of the positive electrode which is targeted in the second step. Accordingly, since a pre-lithiation rate may be improved by a large potential difference between the positive electrode and the lithium layer, preparation processability of a battery may be improved. Furthermore, in a case in which the lithium ions are intercalated into the negative electrode through the first step, since the lithium ions may be uniformly intercalated into a plurality of negative electrodes in the battery and a third step of allowing the battery to go through a sufficient period of rest is performed after the second step, an amount of the lithium ions intercalated into a plurality of positive electrodes in the battery may be uniform. Accordingly, distortion and disconnection of the battery may be improved, and capacity and life (cycle) characteristics of the battery may be improved.

MODE FOR CARRYING OUT THE INVENTION

Figure 1:
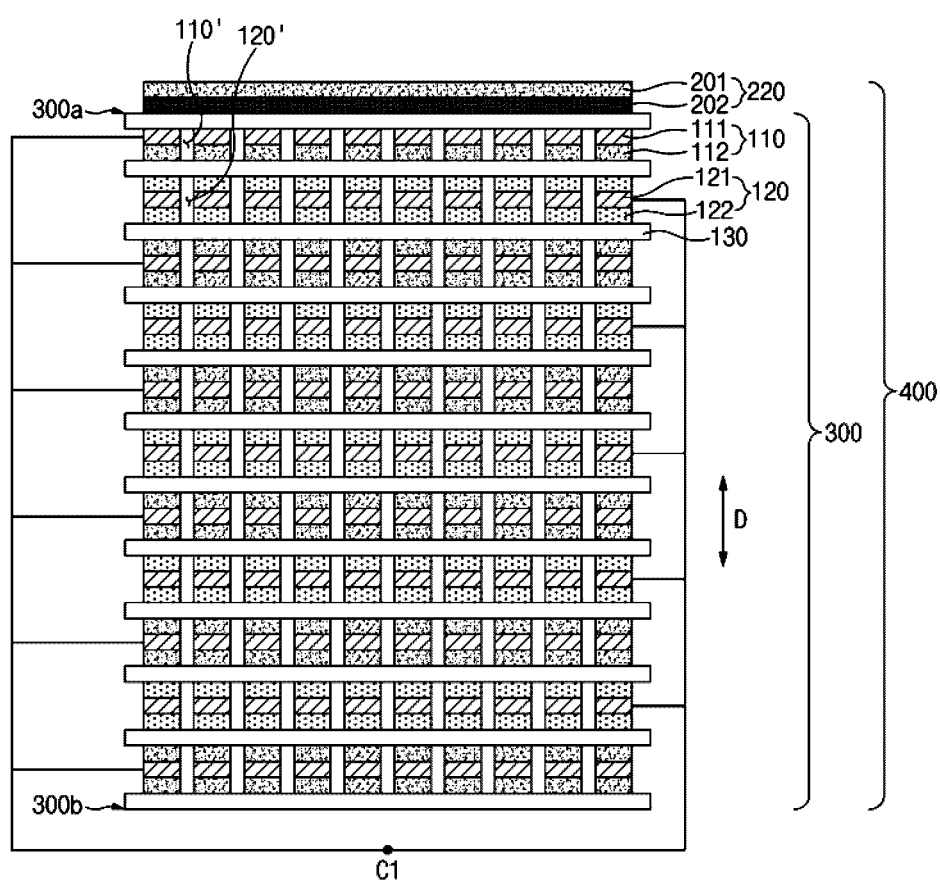
FIG. 1 is a schematic view for explaining a first step in a method of preparing a secondary battery according to an embodiment of the present invention.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

The expression "average particle diameter ($D_{50}$)" in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

Hereinafter, the present invention will be described in detail.

<Method of Preparing Secondary Battery>

A method of preparing a secondary battery according to an embodiment of the present invention includes: pre-lithiating an electrode assembly which includes an electrode structure including a plurality of electrodes and a plurality of separators; and a metal substrate, wherein the plurality of negative electrodes and the plurality of separators are alternatingly stacked, wherein the metal substrate is present on an outermost surface of the electrode structure in a direction in which the electrode and the separator are stacked, wherein the plurality of electrodes includes negative electrodes, each comprising negative electrode active material layer, and positive electrodes, each including positive electrode active material layer, wherein each positive electrode and negative electrode are spaced apart from each other with one separator of the plurality of separators disposed therebetween, wherein the pre-lithiating includes a first step of supplying lithium ions from one of the plurality of positive electrodes to one of the plurality of negative electrodes up to a state of charge (SOC) of A % by electrically connecting one of the plurality of positive electrodes and one of the plurality of negative electrodes and applying a first current; a second step of supplying lithium ions from the metal substrate to one of the plurality of positive electrodes up to B % of capacity of one of the plurality of positive electrodes by electrically connecting the metal substrate and one of the plurality of positive electrodes and applying a second current, after applying the first current; and a third step of resting the electrode assembly, after applying the second current, and A and B satisfy A>B.

Typically, pre-lithiation has been performed by supplying lithium ions to a negative electrode simply by connecting the negative electrode and a metal substrate, but this method has a limitation in that it takes a long time to complete the pre-lithiation due to a low potential difference between the negative electrode and the metal substrate (including a lithium layer). Also, since distances between the metal substrate and the negative electrodes in an electrode assembly are all different, thicknesses of the negative electrodes in the electrode assembly are not uniform after the pre-lithiation is completed, and thus, disconnection may occur due to a severe degree of distortion of a battery.

Alternatively, the method of preparing a secondary battery according to the embodiment of the present invention is characterized in that the first step, the second step, and the third step are sequentially performed. In the first step, lithium ions are rapidly supplied from the positive electrode to the negative electrode due to a large potential difference between the positive electrode and the negative electrode. Thereafter, lithium ions are supplied from the metal substrate to the positive electrode through the second step. In this case, a pre-lithiation rate may be improved by a large potential difference between the positive electrode and the metal substrate (including a lithium layer). A state of charge (SOC) % (expressed as an SOC of A % in the present specification) targeted in the first step is greater than a ratio (expressed as B % of positive electrode capacity in the present specification) of capacity of the lithium ions intercalated into the positive electrode to capacity of the positive electrode which is targeted in the second step. Accordingly, since a difference between a potential of the positive electrode and a potential of the metal substrate is increased, an amount of the lithium ions, which may be accommodated by the positive electrode, is greater than an amount of lithium supplied from the metal substrate, and thus, the pre-lithiation rate may be further improved. Thus, preparation processability of a battery may be improved. Also, in a case in which the lithium ions are intercalated into the negative electrode through the first step, since the lithium ions may be uniformly intercalated into a plurality of negative electrodes in the battery and a third step of allowing the battery to go through a sufficient period of rest is performed after the second step, an amount of the lithium ions intercalated into a plurality of positive electrodes in the battery may be uniform. Accordingly, distortion and disconnection of the battery may be improved, and capacity and life (cycle) characteristics of the battery may be improved.

Figure 2:
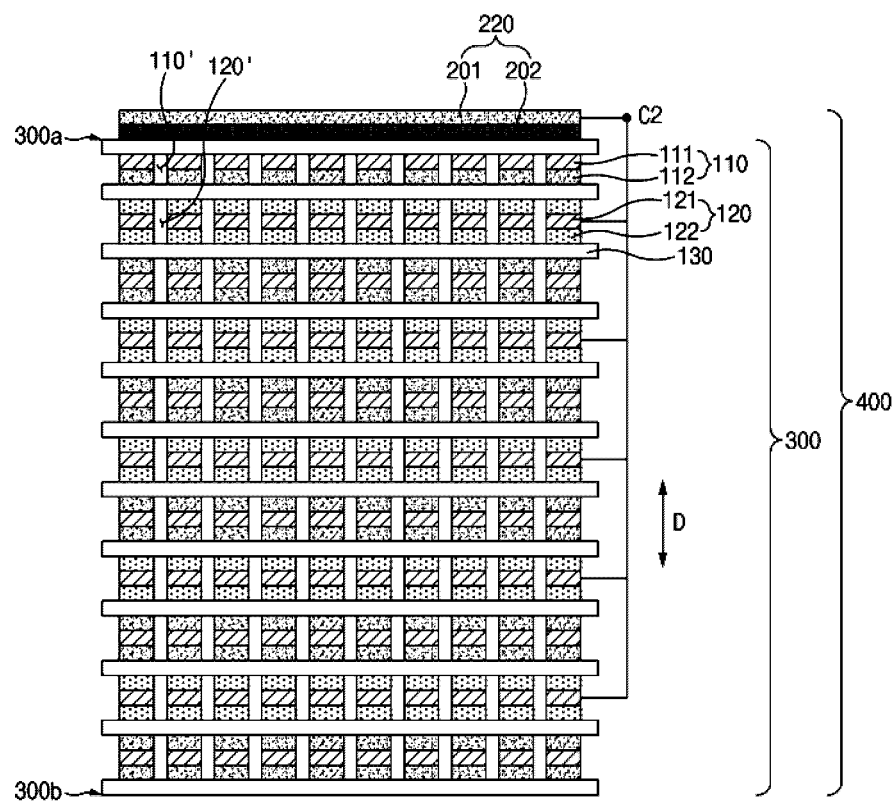
FIG. 2 is a schematic view for explaining a second step in the method of preparing a secondary battery according to the embodiment of the present invention.

Referring to FIG. 1 and FIG. 2, an electrode assembly 400 may include an electrode structure 300 and a metal substrate 220.

1. Electrode Structure

The electrode structure 300 may include electrodes 110 and 120 and a separator 130. The electrodes 110 and 120 may be plural, and the separator 130 may be plural. The electrodes 110 and 120 and the separator 130 may be alternatingly stacked. The electrode structure 300 may be a structure in which a plurality of unit cells is stacked, and the unit cell means one including one negative electrode and one positive electrode.

(1) Electrode

The electrodes 110 and 120 may include a negative electrode 110 and a positive electrode 120. The positive electrode 120 and the negative electrode 110 may be spaced apart from each other with the separator 130 disposed therebetween. Specifically, the separator 130 may be disposed on the negative electrode 110 while being in contact with the negative electrode 110, and the positive electrode 120 is disposed on the separator 130. Accordingly, the electrodes 110 and 120 and the separator 130 may be alternatingly stacked.

The electrode may include current collectors 111 and 121. The current collectors 111 and 121 may be included in the negative electrode 110 and the positive electrode 120, respectively.

The current collectors 111 and 121 are not particularly limited as long as they have high conductivity without causing adverse chemical changes in the battery. Specifically, copper, stainless steel, aluminum, nickel, titanium, fired carbon, copper or stainless steel that is surface-treated with one of carbon, nickel, titanium, silver, or the like, and an aluminum-cadmium alloy may be used as the current collectors 111 and 121. The current collectors 111 and 121 may typically have a thickness of 3 μm to 500 μm. Microscopic irregularities may be formed on surfaces of the current collectors 111 and 121 to improve adhesion with the negative electrode active material layer or the positive electrode active material layer. For example, the current collectors 111 and 121 may be used in various shapes such as that of a film, a sheet, a foil, a net, a porous body, a foam body, a non-woven fabric body, and the like.

Furthermore, the current collector may include a primer layer. The primer layer constitutes the surface of the current collector. Specifically, the current collector may include a substrate, such as copper, stainless steel, aluminum, nickel, titanium, fired carbon, copper or stainless steel that is surface-treated with one of carbon, nickel, titanium, silver, or the like, and an aluminum-cadmium alloy, and the primer layer disposed on the substrate. Adhesion between the current collector and the negative electrode active material layer and adhesion between the current collector and the positive electrode active material layer may be improved by the primer layer. The primer layer may include a conductive material and a polymer. The conductive material may include any one selected from the group consisting of carbon black, acetylene black, Ketjen black, carbon fibers, carbon nanotubes, and graphene, or a mixture of two or more thereof. The polymer may be any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide, and polyamide-imide, or a mixture of two or more thereof.

The negative electrode 110 may include a negative electrode active material layer 112. Specifically, the negative electrode active material layer 112 may be disposed on the current collector 111, and, more specifically, the negative electrode active material layer 112 may be disposed on one or both surfaces of the current collector 111.

The negative electrode active material layer 112 may include a negative electrode active material.

The negative electrode active material may include silicon, and may be specifically formed of silicon.

The silicon is a particle formed of silicon (Si) and may include so-called "pure silicon". The pure silicon is advantageous in that its capacity is about 2.5 to 3 times higher than that of silicon oxide (for example, $SiO_x$ (0<x<2)), but, since a degree of volume expansion/contraction of the silicon is much larger than that of the silicon oxide, it is more difficult to commercialize the silicon. However, with respect to the present invention, since the battery is set to be operated only in a region where the volume expansion of the silicon is not excessive through a pre-lithiation process, a problem of degradation of life characteristics of the battery due to the use of the silicon may be minimized. Also, advantages, such as high capacity, high energy density, and high rate capability, of the silicon may be more preferably achieved.

The silicon may be silicon particles, silicon nanowires, or porous silicon, but is not limited thereto.

An average particle diameter ($D_{50}$) of the silicon may be in a range of 0.01 μm to 50 μm, for example, 0.1 μm to 10 μm. In a case in which the above range is satisfied, an improvement in the life characteristics by the pre-lithiation process may be more effectively performed.

The silicon may be included in an amount of 50 wt % to wt %, for example, 60 wt % to 80 wt % in the negative electrode active material layer 112. In a case in which the above range is satisfied, capacity and energy density of the battery may be increased, and negative electrode adhesion (resistance to exfoliation of the negative electrode active material from the negative electrode) may be maintained after the pre-lithiation process.

The negative electrode active material layer 112 may further include a negative electrode binder and/or a negative electrode conductive agent together with the negative electrode active material.

The negative electrode binder may be used to improve adhesion between the negative electrode active material layer and a negative electrode collector to be described later, or to improve adhesion between the silicon particles.

Specifically, the negative electrode binder may include polyvinylidene fluoride (PVDF), polyvinylidene fluoride-co-hexafluoro propylene (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, a styrene-butadiene rubber (SBR), a fluoro rubber, and various copolymers thereof, and any one thereof or a mixture of two or more thereof may be used.

The negative electrode conductive agent may be used to assist and improve conductivity in the secondary battery, and is not particularly limited as long as it has conductivity without causing adverse chemical changes. Specifically, the negative electrode conductive agent may include at least one selected from the group consisting of graphite such as natural graphite and artificial graphite; carbon black such as acetylene black, Ketjen black, channel black, furnace black, lamp black, and thermal black; conductive fibers such as carbon fibers or metal fibers; conductive tubes such as carbon nanotubes; fluorocarbon; metal powders such as aluminum powder and nickel powder; conductive whiskers such as zinc oxide whiskers and potassium titanate whiskers; conductive metal oxide such as titanium oxide; and polyphenylene derivatives, and may preferably include carbon black in terms of achieving high conductivity.

A loading amount of the negative electrode active material layer 112 may be in a range of 2 mAh/cm$^2$ to 50 mAh/cm$^2$, for example, 5 mAh/cm$^2$ to 25 mAh/cm$^2$. In a case in which the above range is satisfied, the life characteristics of the battery may be improved while the energy density of the battery is highly maintained.

The positive electrode 120 may include a positive electrode active material layer 122.

The positive electrode active material layer 122 may include a positive electrode active material.

The positive electrode active material may include at least one selected from the group consisting of LiMn$_2$O$_4$, Li(Ni$_p$Co$_q$Mn$_r$Ma$_s$)O$_2$ ($0 \leq p \leq 1$, $0 \leq q \leq 1$, $0 \leq r \leq 1$, $p+q+r+s=1$, Ma is at least one selected from the group consisting of aluminum (Al), iron (Fe), vanadium (V), chromium (Cr), titanium (Ti), tantalum (Ta), magnesium (Mg), and molybdenum (Mo)), LiMbO$_2$ (Mb is at least one selected from the group consisting of Al, Fe, V, Cr, Ti, Ta, Mg, and Mo), and LiFePO$_4$.

The positive electrode active material may be included in an amount of 80 wt % to 99.9 wt % and may be specifically included in an amount of 90 wt % to 99 wt % in the positive electrode active material layer 122. In a case in which the above range is satisfied, the life characteristics of the battery may be improved by improving positive electrode adhesion while the energy density of the battery is highly maintained.

The positive electrode active material layer 122 may further include a positive electrode binder and/or a positive electrode conductive agent together with the positive electrode active material.

The positive electrode binder may be used to improve adhesion between the positive electrode active material layer and a positive electrode collector to be described later, or to improve adhesion between the positive electrode active material particles.

Specifically, the positive electrode binder may include polyvinylidene fluoride (PVDF), polyvinylidene fluoride-co-hexafluoro propylene (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, a styrene-butadiene rubber (SBR), a fluoro rubber, and various copolymers thereof, and any one thereof or a mixture of two or more thereof may be used.

The positive electrode conductive agent may be used to assist and improve conductivity in the secondary battery, and is not particularly limited as long as it has conductivity without causing adverse chemical changes. Specifically, the positive electrode conductive agent may include at least one selected from the group consisting of graphite such as natural graphite and artificial graphite; carbon black such as acetylene black, Ketjen black, channel black, furnace black, lamp black, and thermal black; conductive fibers such as carbon fibers or metal fibers; conductive tubes such as carbon nanotubes; fluorocarbon; metal powders such as aluminum powder and nickel powder; conductive whiskers such as zinc oxide whiskers and potassium titanate whiskers; conductive metal oxide such as titanium oxide; and polyphenylene derivatives, and may preferably include carbon black in terms of achieving high conductivity.

A loading amount of the positive electrode active material layer 122 may be in a range of 1 mAh/cm$^2$ to 10 mAh/cm$^2$, for example, 2 mAh/cm$^2$ to 7 mAh/cm$^2$. In a case in which the above range is satisfied, since the energy density of the battery may be increased and an N/P ratio of the negative electrode and the positive electrode may be adjusted to an appropriate level, the life characteristics of the battery may be further improved.

The electrodes 110 and 120 may include holes 110' and 120'. The holes 110' and 120' may include at least one of the hole 110' included in the negative electrode 110 and the hole 120' included in the positive electrode 120. In other words, the plurality of electrodes comprise holes penetrating the individual electrodes.

The holes 110' and 120' may penetrate the electrode. Specifically, with respect to the negative electrode 110, the hole 110' may penetrate both the negative active material layer 112 and the current collector 111. With respect to the positive electrode 120, the hole 120' may penetrate both the positive electrode active material layer 122 and the current collector 121.

The holes 110' and 120' act as a passage through which the lithium may smoothly reach the negative electrode 110 in the electrode structure 300. Accordingly, since the pre-lithiation process may be smoothly performed by the holes 110' and 120', the battery is operated only in a region where the volume expansion of the silicon is not excessive, and thus, the life characteristics of the battery may be improved. Furthermore, since the hole 110' included in the negative electrode 110 may play a role in minimizing generation of excessive stress due to the volume expansion of the silicon, the life characteristics of the battery may be further improved.

The holes 110' and 120' may be formed in a cylindrical shape, a square column shape, or a triangular column shape, and may be specifically formed in a cylindrical shape.

Figure 3:
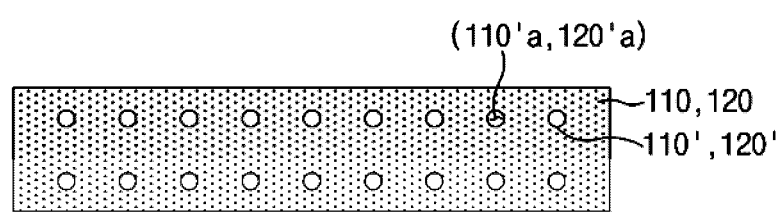
FIG. 3 is a schematic view for explaining an electrode in the method of preparing a secondary battery according to the embodiment of the present invention.

The holes 110' and 120' may have a diameter of 1 μm to 100 μm, for example, 5 μm to 30 μm (see FIG. 3). Herein, the diameter may correspond to a diameter of openings 110'$a$ and 120'$a$ of the holes 110' and 120' formed on surfaces of the electrodes 110 and 120. In a case in which the above range is satisfied, movement of the lithium is smooth, and, particularly, when using the silicon, damage to the electrode due to the volume expansion of the silicon may be prevented during the pre-lithiation process.

A ratio of an area of the surface of the electrodes 110 and 120 to an area occupied by the openings 110'$a$ and 120'$a$ of the holes 110' and 120' on the surface of the electrodes 110 and 120 may be in a range of 99.9:0.1 to 80:20, and may be specifically in a range of 99.5:0.5 to 90:10. In a case in which the above range is satisfied, there is an effect of facilitating the movement of the lithium while suppressing structural collapse of the electrode. Herein, the area of the surface of the electrodes 110 and 120 means an area excluding the area occupied by the openings 110'$a$ and 120'$a$ of the holes 110' and 120'.

The holes 110' and 120' may be plural, and a spacing between the plurality of holes 110' and 120' may be in a range of 2 μm to 3,000 μm, and may be specifically in a range of 15 μm to 400 μm. In a case in which the above range is satisfied, since a material transfer distance in a direction parallel to the surface of the electrode is decreased, uniform pre-lithiation may be achieved.

(2) Separator

The separator 130 separates the negative electrode and the positive electrode and provides a movement path of lithium ions, wherein any separator may be used as the separator without particular limitation as long as it is typically used in a secondary battery. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multi-layer structure may be selectively used.

2. Metal Substrate

The metal substrate 220 may be disposed on the electrode structure 300, and, specifically, the metal substrate 220 may be in contact with the electrode structure 300. The metal substrate 220 may be disposed on an outermost surface 300a or 300b of the electrode structure 300 in a direction in which the electrodes 110 and 120 and the separator 130 are stacked (D in FIG. 1). When the outermost surface in one direction of the stacking directions is referred to as a top surface 300a and the outermost surface in the other direction is referred to as a bottom surface 300b, the metal substrate 220 may be disposed on the top surface 300a or the bottom surface 300b. Specifically, referring to FIG. 1, in the direction in which the electrodes 110 and 120 and the separator 130 are stacked, the separator 130 is disposed at an outermost part of the electrode structure 300, and the metal substrate 220 may be disposed on the separator 130 which is disposed at the outermost part. Accordingly, an electrical short between the metal substrate 220 and the electrode structure 300 may be prevented.

The metal substrate 220 plays a role in supplying lithium into the electrode structure during the pre-lithiation process.

The metal substrate 220 may include a lithium layer 202. The lithium layer 202 plays a role in supplying lithium to the positive electrode 120 in an embodiment of the present invention.

The lithium layer 202 may contain lithium, and may be specifically formed of lithium. The lithium layer 202 may be in contact with the separator disposed at the outermost part of the electrode structure 300.

A thickness of the lithium layer 202 may be in a range of 2.5 μm to 300 μm, and may be specifically in a range of 10 μm to 150 μm. In a case in which the above range is satisfied, since the lithium layer may no longer exist after the pre-lithiation is completed, stability may be improved when the battery is operated.

The metal substrate 220 may further include a support 201. Specifically, the metal substrate 220 may include the support 201 and the lithium layer 202 disposed on the support 201. The support 201 is used to support the lithium layer 202 containing lithium in an amount required for the pre-lithiation.

3. First Step, Second Step, and Third Step

The method of preparing a secondary battery of the embodiment may include: a first step of applying a first current by electrically connecting the positive electrode and the negative electrode; and a second step of applying a second current by electrically connecting the metal substrate and the positive electrode, after the first step. Both the first step and the second step may be performed in a state in which the electrode assembly is impregnated with an electrolyte.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used.

In particular, since ethylene carbonate and propylene carbonate, as cyclic carbonates among the carbonate-based organic solvents, are highly viscous organic solvents and have high dielectric constants, the ethylene carbonate and propylene carbonate may well dissociate a lithium salt, and, thus, the ethylene carbonate and propylene carbonate may be preferably used. Since an electrolyte having high electrical conductivity may be prepared when the above cyclic carbonate is mixed with low viscosity, low dielectric constant linear carbonate, such as dimethyl carbonate and diethyl carbonate, in an appropriate ratio, the ethylene carbonate and propylene carbonate may be more preferably used.

A lithium salt may be used as the metal salt, and the lithium salt is a material that is easily soluble in the non-aqueous electrolyte, wherein, for example, at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In order to improve the life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the electrolyte components.

The secondary battery may further include a battery case. Specifically, the electrode assembly and the electrolyte may be disposed in the battery case, and the electrode assembly in the battery case may be impregnated with the electrolyte.

(1) First Step

Referring to FIG. 1, in the first step, the positive electrode 120 and the negative electrode 110 are electrically connected (C1), and a first current may be applied. Since lithium ions of the positive electrode 120 may be supplied to the negative electrode 110 by the first current, the lithium ions may be intercalated into the negative electrode. Accordingly, since irreversible sites in the negative electrode may be filled with the lithium ions, initial efficiency of the secondary battery may be improved. Also, since a desired level of lithium ions may be rapidly transferred from the positive electrode to the negative electrode due to a large potential difference between the positive electrode and the negative electrode, processability may be improved during the preparation of the secondary battery. Furthermore, since each of the plurality of negative electrodes is mainly supplied with lithium ions from the adjacent positive electrode, a uniform amount of the lithium ions may be intercalated into the negative electrodes in the final electrode assembly in which the pre-lithiation is completed and thicknesses of the negative electrodes may be uniform. Accordingly, the distortion and disconnection of the battery may be suppressed.

Specifically, in the first step, the positive electrodes 120 are connected to each other to constitute a positive electrode connected body (not shown), and the positive electrode connected body (not shown) is connected to a positive electrode lead (not shown). The negative electrodes 110 are connected to each other to constitute a negative electrode connected body (not shown), and the negative electrode connected body (not shown) is connected to a negative electrode lead (not shown). Thereafter, the positive electrode lead (not shown) and the negative electrode lead (not shown) may be electrically connected (C1).

The first current may be supplied in a constant current mode.

An amount of the first current may be in a range of 0.001 C to 1.000 C, particularly 0.010 C to 0.500 C, and more particularly 0.050 C to 0.200 C. When the amount of the first current is less than 0.001 C, process time is excessively increased to reduce the processability, and, when the amount of the first current is greater than 1.000 C, it is difficult to perform uniform charge due to a rapid reaction of the electrode. Herein, 1 C means an amount of current which may charge or discharge a battery in one hour.

In the first step, after the positive electrode and the negative electrode are electrically connected, a first current is applied so that lithium ions may be supplied from the positive electrode to the negative electrode up to an SOC of A %. Specifically, the first step may be performed from an SOC of 10% to an SOC of 100% ($10 \leq A \leq 100$), more particularly from an SOC of 30% to an SOC of 100% ($30 \leq A \leq 100$), for example, from an SOC of 50% to an SOC of 100% ($50 \leq A \leq 100$). The expression "SOC %" refers to a degree of charge of the secondary battery, wherein SOC 0% means a fully discharged state, and SOC 100% means a fully charged state. The SOC may be measured by a constant current-constant voltage charge/discharge method using a battery charge/discharge cycler (PNE SOLUTION Co., Ltd., PECC model).

(2) Second Step

Referring to FIG. 2, in the second step, the positive electrode lead and the negative electrode lead are disconnected, the positive electrode lead (not shown) and the metal substrate 220 are electrically connected (C2), and a second current may be applied. Since lithium ions of the metal substrate 220 may be supplied to the positive electrode 120 by the second current, the lithium ions may be intercalated into the positive electrode. Accordingly, the lithium ions deintercalated from the positive electrode in the first step may be compensated from the metal substrate 220. Also, since a desired level of lithium ions may be rapidly transferred from the metal substrate 220 to the positive electrode 120 due to a large potential difference between the positive electrode and the metal substrate, the processability may be improved during the preparation of the secondary battery.

Specifically, in the second step, each of the positive electrode 120 and the metal substrate 220 includes a tab (not shown), the tabs of the plurality of positive electrodes 120 are connected to each other, and, thereafter, the tabs connected to each other and the metal substrate 220 may be electrically connected (C2).

In the second step, the second current is applied in a constant current and constant voltage mode, and an amount of the current applied in the constant current mode may be in a range of 0.0001 C to 0.1 C, for example, 0.001 C to 0.05 C. In a case in which the above range is satisfied, uniform pre-lithiation may be achieved within a reasonable process time.

In the second step, the metal substrate and the positive electrode are electrically connected, and a second current is applied so that lithium ions may be supplied from the metal substrate to the positive electrode up to B % of the capacity of the positive electrode.

In the second step, A>B may be satisfied. For example, if the SOC is 75% (A=75) in the first step, lithium ions may be supplied to the positive electrode up to 20% of the capacity of the positive electrode in the second step (75 (A)>20 (B)). Since the lithium ions are intercalated into the negative electrode in the first step, the potential of the positive electrode is increased and a potential of the negative electrode is decreased. Accordingly, the difference between the increased potential of the positive electrode and the potential of the metal substrate is increased. Furthermore, if the relationship A>B is satisfied, sites (acceptable capacity), which may receive the lithium ions in the positive electrode, are increased. An overall pre-lithiation rate is increased by such a mechanism. Accordingly, the preparation processability of the battery may be significantly improved.

Specifically, lithium ions with a capacity corresponding to 2% to 70% ($2 \leq B \leq 70$) of the capacity of one of the plurality of positive electrodes may be intercalated into one of the plurality of positive electrodes by the second current, and more specifically, lithium ions with a capacity corresponding to 5% to 50% ($5 \leq B \leq 50$), for example, 8% to 25% ($8 \leq B \leq 25$) of the capacity of the positive electrode may be intercalated. The expression "positive electrode capacity" refers to a value (unit: mAh) determined by multiplying a loading amount (mAh/cm$^2$) of the positive electrode and a total sum of areas of the plurality of positive electrodes (areas of the positive electrodes facing the negative electrodes) in the battery. In a case in which the above range is satisfied, irreversible capacity of the negative electrode is compensated to an appropriate level to increase the capacity of the battery, and cycle life of the battery may be improved due to excess lithium ions in the negative electrode. The range may be confirmed by integrating a current-time graph, which is measured with charge/discharge equipment (PNE SOLUTION Co., Ltd., PECC model), by time when performing the second step.

For example, A in the first step may be in a range of 40 to 100, and B in the second step may be in a range of 5 to 35, but, alternatively, A in the first step may be in a range of 30 to 100, and B in the second step may be in a range of 3 to 25, but the present invention is not limited thereto.

(3) Third Step

In the third step, the electrode assembly may be rested. The expression "rest" means that no current is applied to the electrode assembly. In the third step, a state, in which the positive electrodes in the electrode assembly are connected to each other through the positive electrode connected body, may be maintained.

Since the second step is performed while satisfying A>B, the farther the positive electrode is away from the metal substrate, the less the amount of the lithium ions intercalated into the positive electrode is, and the amounts of the lithium ions intercalated into the positive electrodes are different from each other. Accordingly, different electrochemical reactions occur for each unit cell in the battery, and there is a problem in that cycle characteristics are different for each unit cell. Thus, in the third step, a deviation of the amount of the lithium ions intercalated into each of the positive electrodes may be reduced by providing a period in which the lithium ions may spontaneously move between the positive electrodes in the battery toward an equilibrium state, and, accordingly, the cycle characteristics of the battery may be stably adjusted.

The rest may be performed for 24 hours to 360 hours, particularly 36 hours to 240 hours, and more particularly 70 hours to 170 hours. In a case in which the above range is satisfied, the deviation of the amount of the lithium ions intercalated into each of the positive electrodes may be effectively reduced.

The secondary battery prepared according to the embodiment of the present invention is suitable for portable devices, such as mobile phones, notebook computers, and digital cameras, and electric cars such as hybrid electric vehicles (HEVs), and, particularly, may be preferably used as a component battery of a medium and large sized battery module. Also, the above-described secondary battery may be included as a unit cell in a medium and large sized battery module. The medium and large sized battery module may be preferably used as a power source requiring high power and large capacity, for example, an electric vehicle, a hybrid electric vehicle, or a power storage device.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES AND COMPARATIVE EXAMPLES

Example 1: Preparation of Secondary Battery (1) Preparation of Electrode Assembly and Electrolyte Impregnation
1) Preparation of Electrode Assembly A negative electrode including a negative electrode collector and a negative electrode active material layer disposed on both sides of the negative electrode collector was prepared. The negative electrode active material layer contained silicon particles, PAA as a binder, and carbon black, as a conductive agent, in a weight ratio of 75:10:15, wherein a loading amount was 10.4 mAh/cm$^2$. Also, although similar to the above negative electrode, a single-sided negative electrode, in which the negative electrode active material layer was disposed only on one side of the negative electrode collector, was prepared.

A positive electrode including a positive electrode collector and a positive electrode active material layer disposed on the positive electrode collector was prepared. The positive electrode active material layer contained LiMn$_2$O$_4$ having an average particle diameter (D$_{50}$) of 12.5 μm, PVDF as a binder, and CNT, as a conductive agent, in a weight ratio of 95:1.5:3.5, wherein a loading amount was 5 mAh/cm$^2$.

Both the negative electrode and the positive electrode included holes having a diameter of 10 μm, and a ratio of an area of a surface of each individual negative electrode (or positive electrode) to an area occupied by openings of the holes on the surface of each individual negative electrode (or positive electrode) was 99:1. Also, a spacing between the holes was 100 μm.

After stacking the five negative electrodes and the five positive electrodes with a polyolefin-based separator disposed therebetween, the single-sided negative electrode was disposed on a top layer (see FIG. 1). Thereafter, separators were disposed on an uppermost surface and a lowermost surface, respectively.

Thereafter, a metal substrate was disposed on the uppermost surface. The metal substrate included a 150 μm thick lithium layer (formed of lithium) and a copper support, and the lithium layer was disposed to be in contact with the separator constituting the uppermost surface.

2) Electrolyte Impregnation

After putting the electrode assembly in a case, an electrolyte, in which 1.0 M lithium hexafluorophosphate (LiPF$_6$) was dissolved in an organic solvent composed of fluoroethylene carbonate/ethylmethyl carbonate (mixing volume ratio of FEC to EMC=3:7), was injected into the case to impregnate the electrode assembly with the electrolyte. From this, a preliminary battery was prepared.

(2) First Step

In the preliminary battery, five positive electrode tabs were connected to each other to form a positive electrode connected body, and the positive electrode connected body was connected to a positive electrode lead. Also, the five negative electrodes and one single-sided negative electrode were connected to each other to form a negative electrode connected body, and the negative electrode connected body was connected to a negative electrode lead. Thereafter, the positive electrode lead and the negative electrode lead were electrically connected.

Thereafter, the preliminary battery was charged to an SOC of 75% by applying a first current at 0.33 C for 2.3 hours. The SOC was measured in a constant current-constant voltage mode using a charge/discharge cycler.

(3) Second Step

After the first step, the positive electrode lead and the negative electrode lead were disconnected, and the metal substrate and the positive electrode lead were then connected. Thereafter, a current was applied to supply lithium ions of the lithium layer of the metal substrate to the positive electrode. When the current was applied in the second step, 0.1 C-3.0 V constant current-constant voltage (CC-CV) discharge was applied, the second step was performed by setting 20% of the calculated capacity of the positive electrode as a capacity limit value, and lithium ions as much as 20% of the positive electrode capacity were intercalated into the positive electrode for 10.2 hours (measured with PECC model charge/discharge equipment, PNE SOLUTION Co., Ltd.).

(4) Third Step

In a state in which the positive electrodes in the preliminary battery were still connected to each other through the positive electrode connected body, the preliminary battery subjected to the second step was rested for 140 hours.

Example 2: Preparation of Secondary Battery

A secondary battery was prepared in the same manner as in Example 1 except that the first step was performed up to an SOC of 100%.

Comparative Example 1: Preparation of Secondary Battery

After preparing a preliminary battery in the same manner as in Example 1, a negative electrode lead and a metal substrate were electrically connected, and a current was applied at 0.002 C-0.2 V (CC-CV) for 180 hours to supply lithium ions of a lithium layer of the metal substrate to a negative electrode so as to reach 8% of total capacity of the preliminary battery (SOC of 8%). This was confirmed by charge/discharge equipment.

Comparative Example 2: Preparation of Secondary Battery

A secondary battery was prepared in the same manner as in Example 1 except that the first step was performed up to an SOC of 20% and the third step (rest) was not performed.

Comparative Example 3: Preparation of Secondary Battery

A secondary battery was prepared in the same manner as in Example 1 except that the third step (rest) was not performed.

TABLE 1

| | SOC of A %, final charge in the first step | Ratio of capacity of lithium ions intercalated into the positive electrode to the positive electrode capacity (B %) | Current rate in the second step | Time taken to the second step |
|---|---|---|---|---|
| Example 1 | SOC of 75% | 20% | 0.1 C | 10.2 hrs |
| Example 2 | SOC of 100% | 20% | 0.1 C | 8.4 hrs |
| Comparative Example 1 | After connecting negative electrode and lithium metal, current was supplied at a current rate of 0.002 C to intercalate lithium into the negative electrode up to an SOC of 8%, and it took a total of 180 hrs. | | | |
| Comparative Example 2 | SOC of 20% | 20% | 0.002 C | 100 hrs |
| Comparative Example 2 | SOC of 75% | 20% | 0.1 C | 10.2 hrs |

Experimental Example 1: Comparison of Time to Pre-Lithiation (Time Taken to the Second Step)

Comparison with respect to Comparative Example 3, which was performed up to the second step in the same manner as in Example 1, was not performed.

20% of the positive electrode capacity of Examples 1 and 2 and an SOC of 8% of Comparative Example 1 were all suitable for comparing intercalation rates of external lithium ions in terms of how much lithium ions were intercalated from the outside. With respect to Comparative Example 1, it took 180 hours to complete the second step, but pre-lithiation was only performed up to 8%, and the current was almost zero so that additional pre-lithiation was not possible.

With respect to Comparative Example 2, lithium ions were intercalated into the negative electrode at an SOC level of 20% in the first step by the lithium ions supplied from the positive electrode to the negative electrode, and, in the second step, an amount of the lithium ions, which may be accommodated by the positive electrode, and an amount of the lithium ions supplied from the metal substrate were approximately equal. Thus, lithium ions were intercalated into the positive electrode in order from the positive electrode near the lithium metal to the positive electrode far from the lithium metal and sequentially filled so that the capacity of the positive electrode became 100%, and a potential difference between the positive electrode and the metal substrate was not sufficient. Accordingly, since there was a limit to the increase in pre-lithiation rate, it took a long time like 100 hours.

In contrast, since the SOC % after the first step was at a high level in Examples 1 and 2, a potential of the positive electrode was further increased, and thus, a rate at which the second step was performed may be significantly increased. Accordingly, times taken to the second step were short at 10.2 hours and 8.4 hours, respectively.

Experimental Example 2: Confirmation of Deviation of Capacity of the Positive Electrode after Pre-Lithiation Deviations of the positive electrode capacity of Example 1 subjected to the third step (rest period) and Comparative Example 3 not subjected to the third step were confirmed.

Specifically, after separating the positive electrodes from the battery, a plurality of monocells including each of the positive electrodes and a new negative electrode was prepared to evaluate discharge capacity of the positive electrode. The capacities of the plurality of positive electrodes were averaged to confirm an average positive electrode capacity, and a deviation was calculated to confirm a standard deviation of the positive electrode capacity. The results thereof are presented in Table 2 below.

TABLE 2

| | Average positive electrode capacity (mAh) | Standard deviation of positive electrode capacity (mAh) |
|---|---|---|
| Example 1 | 87.8 | 1.53 |
| Comparative Example 3 | 88.5 | 17.2 |

From the results of Table 2, it was confirmed that, with respect to Example 1 which were sufficiently subjected to the rest period, a uniform amount of lithium ions may be intercalated into the positive electrodes in the battery.

The invention claimed is:

1. A method of preparing a secondary battery, the method comprising:
   pre-lithiating an electrode assembly comprising an electrode structure comprising a plurality of electrodes and a plurality of separators; and a metal substrate,
   wherein the plurality of electrodes and the plurality of separators are alternatingly stacked,
   wherein the metal substrate is present on an outermost surface of the electrode structure in a direction in which the plurality of electrodes and the plurality of separators are stacked, wherein the plurality of electrodes comprises negative electrodes, each comprising negative electrode active material layer, and positive electrodes, each comprising positive electrode active material layer, wherein each positive electrode and negative electrode are spaced apart from each other with one separator of the plurality of separators disposed therebetween, wherein the pre-lithiating comprises sequentially (i)-(iii):

(i) supplying lithium ions from one of the plurality of the positive electrodes to one of the plurality of negative electrodes up to a state of charge (SOC) of A % by electrically connecting one of the plurality of positive electrodes and one of the plurality of negative electrodes and applying a first current;

(ii) supplying lithium ions from the metal substrate to one of the plurality of positive electrodes up to B % of capacity of one of the plurality of the positive electrodes by electrically connecting the metal substrate and one of the plurality of positive electrodes and applying a second current, after applying the first current; and (iii) resting the electrode assembly after applying the second current, and wherein A and B satisfy A>B.

2. The method of claim 1, wherein the first current is applied from an SOC of 10% to an SOC of 100% wherein 10≤A≤100.

3. The method of claim 1, wherein an amount of the first current is in a range of 0.001 C to 1.000 C.

4. The method of claim 1, wherein,
the second current is applied in a constant current and constant voltage mode, and
an amount of the second current applied in the constant current mode is in a range of 0.0001 C to 0.1 C.

5. The method of claim 1, wherein,
after applying the second current, the electrode assembly is rested for 24 hours to 360 hours.

6. The method of claim 1, wherein the plurality of electrodes comprise holes penetrating individual electrodes.

7. The method of claim 6, wherein a ratio of an area of a surface of each individual electrode to an area occupied by openings of the holes on a surface of each individual electrode is in a range of 99.9:0.1 to 80:20.

8. The method of claim 7, wherein an opening of each hole has a diameter of 1 μm to 100 μm.

9. The method of claim 1, wherein the negative electrode active material layer comprises a negative electrode active material, and
wherein the negative electrode active material comprises silicon.

10. The method of claim 1, wherein the metal substrate comprises a lithium layer.

11. The method of claim 10, wherein the lithium layer has a thickness of 2.5 μm to 300 μm.

12. The method of claim 1, wherein A and B satisfy 10≤A≤100 and 2≤B≤70.

* * * * *